United States Patent
Swartz

[19]

[11] Patent Number: 6,012,750
[45] Date of Patent: Jan. 11, 2000

[54] SPATULA

[76] Inventor: Stephen J. Swartz, 603 Harding Rd., Little Silver, N.J. 07739

[21] Appl. No.: 08/880,346

[22] Filed: Jun. 23, 1997

Related U.S. Application Data

[63] Continuation-in-part of application No. 08/581,356, Dec. 29, 1995, abandoned.

[51] Int. Cl.[7] ...................................................... A47J 43/28
[52] U.S. Cl. ................................................................ 294/7
[58] Field of Search ............................... 294/7, 8, 32, 49, 294/55, 56; 15/236.01, 236.08; 30/124, 136, 142, 169, 324; D7/688, 689, 691, 692

[56] References Cited

U.S. PATENT DOCUMENTS

| | | | |
|---|---|---|---|
| D. 54,150 | 11/1919 | Underhill . | |
| D. 298,792 | 12/1988 | Tucker et al. ............................ | D7/692 |
| D. 307,855 | 5/1990 | Light, Jr. . | |
| 1,228,821 | 6/1917 | Reynolds ..................................... | 294/7 |
| 1,544,231 | 6/1925 | Hobbs ....................................... | 294/32 |
| 1,612,367 | 12/1926 | Fulton ........................................ | 294/7 |
| 1,723,507 | 8/1929 | Haertter ..................................... | 294/7 |
| 1,856,769 | 5/1932 | Latshaw . | |
| 2,489,606 | 11/1949 | Allen . | |
| 2,563,255 | 8/1951 | Loomis ................................. | D7/688 X |
| 2,589,753 | 3/1952 | Vinson .................................. | 30/142 X |
| 2,858,611 | 11/1958 | Arneberg . | |
| 3,492,039 | 1/1970 | Chmela ..................................... | 294/7 |
| 3,838,511 | 10/1974 | Hiles ...................................... | 294/55 X |
| 3,877,143 | 4/1975 | Montesi .................................. | 294/7 X |
| 4,711,029 | 12/1987 | Somerset ................................ | 294/7 X |
| 5,386,633 | 2/1995 | Kanno ..................................... | 294/7 X |
| 5,573,292 | 11/1996 | Citino ........................................ | 294/7 |

FOREIGN PATENT DOCUMENTS

| | | | |
|---|---|---|---|
| 1139518 | 7/1957 | France ........................................ | 294/7 |

*Primary Examiner*—Johnny D. Cherry
*Attorney, Agent, or Firm*—Klauber & Jackson

[57] ABSTRACT

In one embodiment, a spatula for removing an object from a support surface and for substantially preventing the object from falling off during handling, the spatula including a blade having a top surface, a bottom surface, a front end and a rear end, wherein the blade has a prying portion including a distal end disposed at the front end of the blade and a proximal end, and wherein the blade has a cradle portion disposed rearwardly adjacent the prying portion and including a distal end attached to the proximal end of the prying portion, a proximal end, and a transverse stop section disposed between the distal and proximal ends of the cradle portion for arresting movement of the object upon the top surface of the blade.

16 Claims, 10 Drawing Sheets

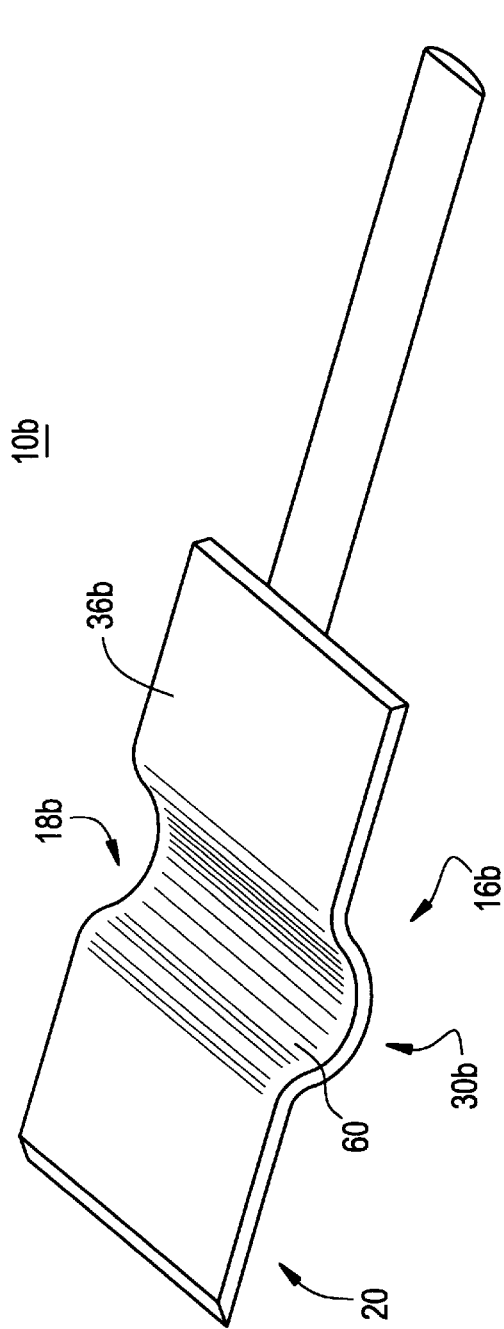
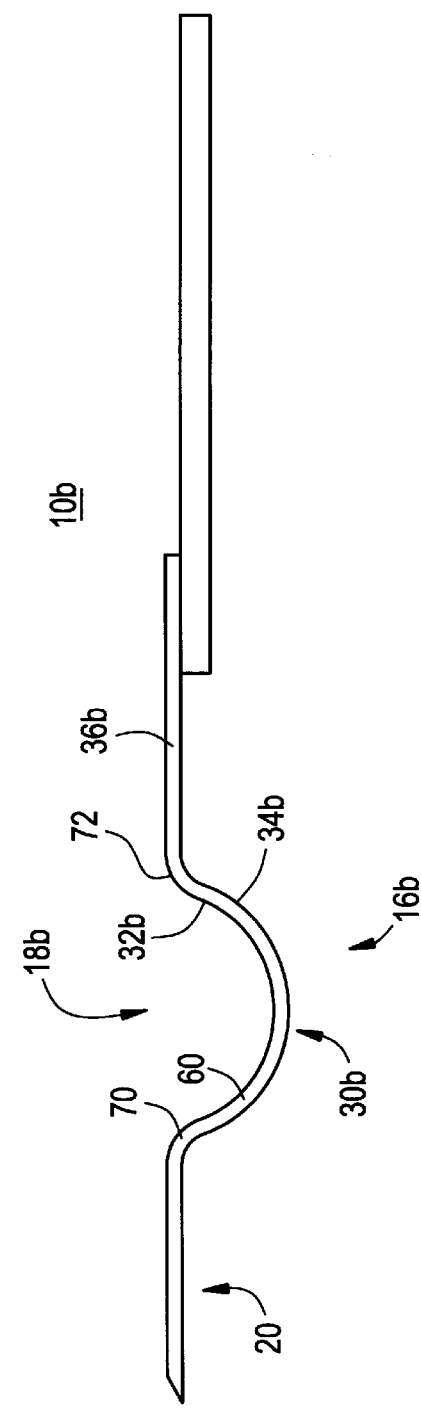

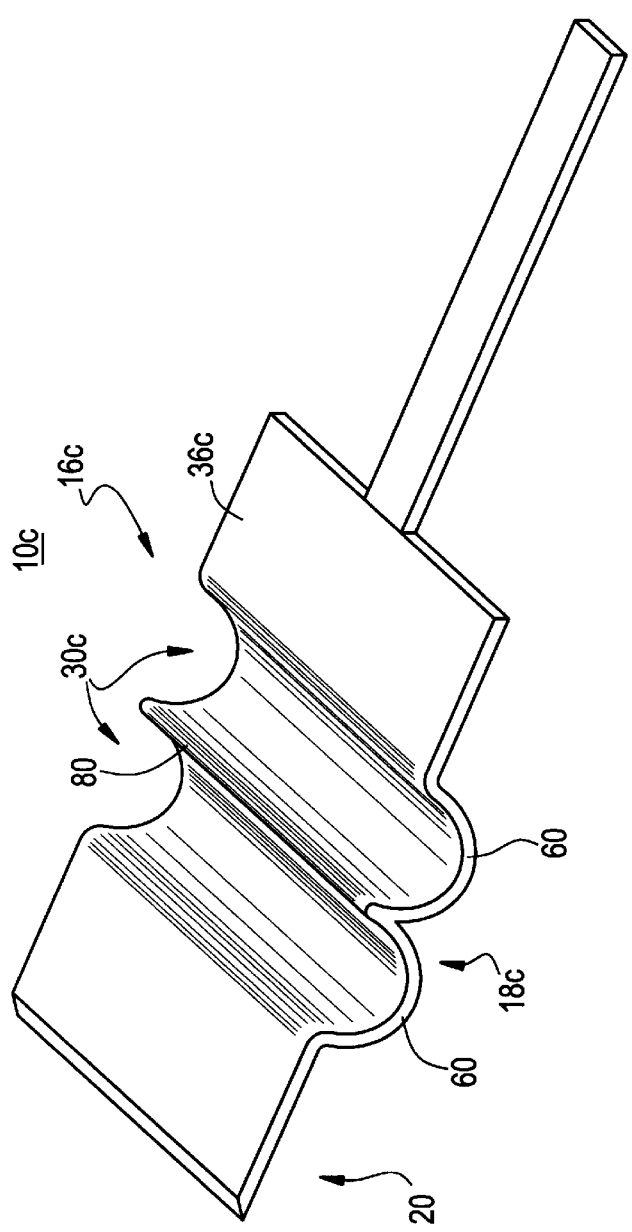
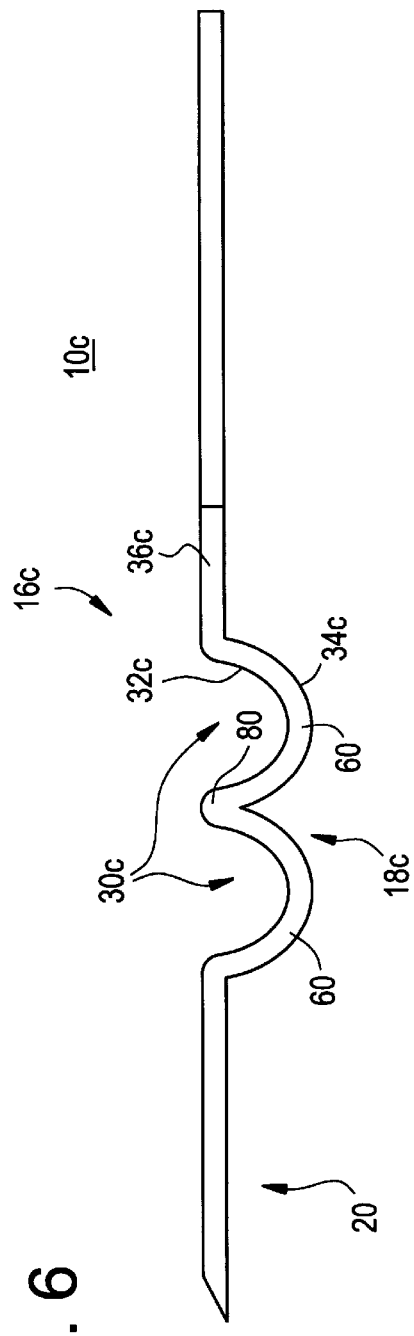
FIG. 5
FIG. 6

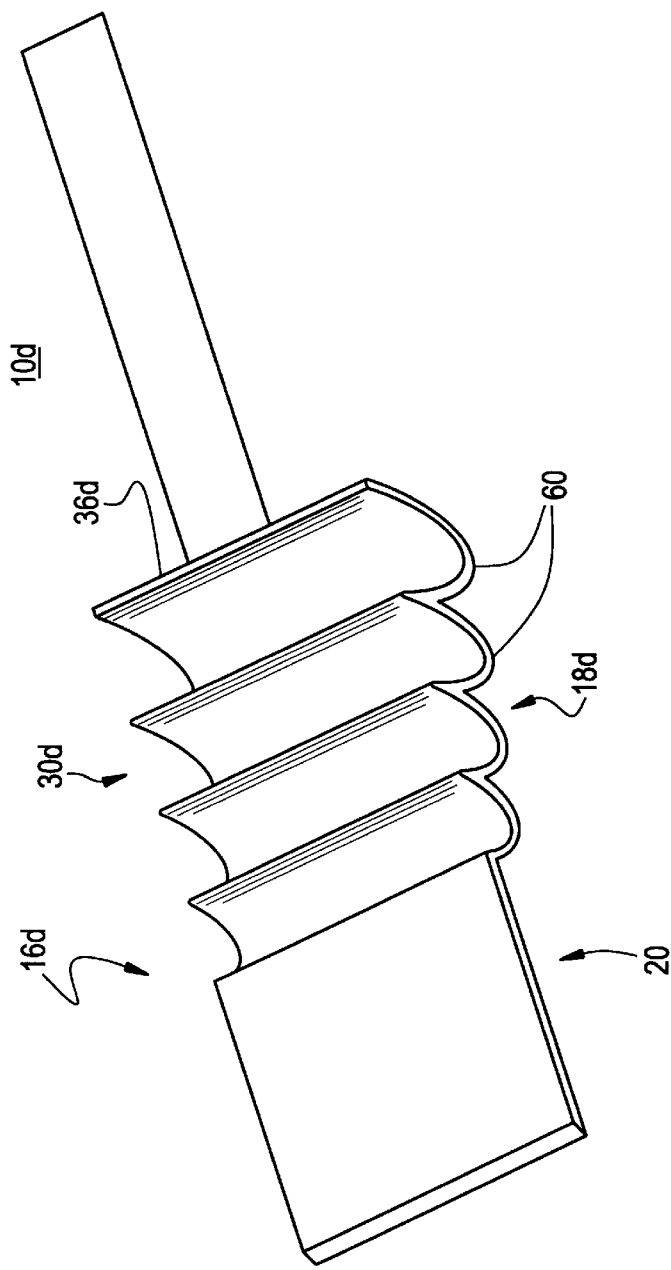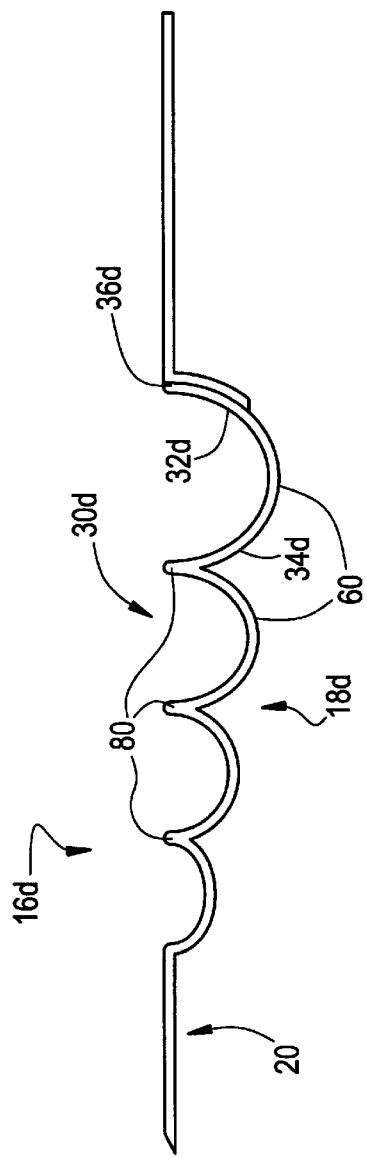

SPATULA

This is a continuation-in-part of copending application Ser. No. 08/581,356 filed on Dec. 29, 1995, now abandoned, all of which is herein incorporated by reference in its entirety.

FIELD OF THE INVENTION

The present invention relates to cooking, barbecuing, and grilling utensils generally and, more particularly, but not by way of limitation, to a novel spatula.

BACKGROUND OF THE INVENTION

When cooking hot dogs, sausages, kielbasa, or other somewhat cylindrically shaped foods upon a grill or barbecue rack, the cook is presented with the challenge of removing such foods from the cooking surface and transporting the food to another location, a receptacle or a ready bun. The shape of such foodstuffs lends to a high probability that the item will roll off the ordinary spatula. The cook may choose to employ a fork or tongs to remove the food, but that would necessitate the setting aside of one utensil, for example, the ordinary spatula, and searching for and retrieving another tool. Moreover, a cook is likely to prepare other foods concurrently with the hot dogs, such as hamburgers, for which the utensil of choice is a spatula-like tool. Thus, a spatula which can accommodate hot dogs or the like would be more efficient, useful and convenient for a cook to use rather than having to search for and swap various utensils.

A culinary implement is described in U.S. Pat. No. 1,856,769 issued May 3, 1932 to Latshaw, which has straight tines as well as tines formed with wavy portions. The wavy tines are positioned below the plane of the top edges of the top edges of the straight tines. This device was intended to serve as a stirring implement for expeditiously mixing, stirring, beating, cutting and serving doughs, gravies, mashed potatoes and the like. Although the wavy portions of the invention may tend to facilitate the removal and transport of amorphous clumps of food such as mashed potatoes, the placement of a hot dog or sausage atop the device would appear to be no more stable and indeed even less stable than placing same on a flat spatula, given the placement of the wavy tines below the straight tines.

U.S. Pat. No. 2,489,606 issued Nov. 29, 1949 to Allen, discloses a spatula intended to be relatively inflexible over the majority of the blade portion but having a highly flexible tip portion. Stiffness is achieved by a plurality of longitudinal stiffening corrugations along the length of the blade. The highly flexible tip is achieved by a transverse corrugation which is susceptible to transverse flexing. While this spatula may provide a flexible joint for its tip portion to follow the contours of various surfaces, the invention provides no enhanced capability to manage or contain cylindrically shaped foodstuffs. The transverse corrugation cannot provide any substantial food carrying capability as it is designed to be the flex point for the outermost tip of the spatula. Moreover, the patent teaches a transverse corrugation in the shape of a half-cylinder having a radius on the order of $3/32$ inch.

Similarly, the picnic fork disclosed in U.S. Pat. No. 2,858,611 issued Nov. 4, 1958 to Arneberg relates to tine or skewer-equipped devices for cooking frankfurters, wieners, etc., the invention employing connecting cross sectionally U-shaped rib sections to impart rigidity to the tines, connector and shank. The invention clearly contemplates piercing a hot dog before cooking, then inserting both hot dog and picnic fork over a heat source. The invention cannot be easily used as a spatula, and has no inherent ability to balance a hot dog or sausage upon its surface.

Design U.S. Pat. No. 54,150 issued on Nov. 4, 1919 to Underhill shows an "Asparagus Server or Similar Article" as having three upwardly concave receptacles for holding asparagus. The outermost edges of the receptacles curve upward and inward, preventing the invention from being used as a spatula. Apparently, a user of the invention would place each asparagus in a receptacle by hand, or scoop asparagus out of a pile of asparagus situated in a bowl or on a plate.

In a similar manner, the scoop shown in Design U.S. Pat. No. 307,855 issued on May 15, 1990 to Light, Jr. has an upwardly concave receptacle. While the invention might be useful for retrieving cylindrically shaped foods from a pile of food situated within a bowl or on a plate, the invention would be more difficult to use when retrieving same from a flat surface because the outermost edge of the receptacle curves upwardly.

Accordingly, it is a principal object of the present invention to provide a device for retrieving objects, and particularly, to cylindrically shaped foods such as hot dogs, frankfurters, wieners, sausages, kielbasa, and the like, from a support surface, which is typically substantially horizontal, such as a grill or barbecue, and transporting such objects or foods without their dropping off the spatula.

It is another object of the invention to provide such device as can be used as well with other generally elongate objects or foods having various cross-sectional shapes.

It is an additional object of the invention to provide such device which is economical to construct.

It is yet another object of the invention to provide such device which is easy to use.

It is a further object of the invention to provide such device which is rugged and durable.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, a spatula comprising a blade having a top surface, a bottom surface, a front end and a rear end. The blade further comprises a prying portion and a cradle portion. The prying portion includes a distal end disposed at the front end of the blade and a proximal end. The cradle portion is disposed rearwardly adjacent the prying portion and includes a distal end attached to the proximal end of the prying portion, a proximal end, and a transverse stop means disposed between the distal and proximal ends of the cradle portion for arresting movement, such as longitudinal movement, of the object upon the top surface of the blade.

The prying portion is preferably flexible, and further preferably more flexible than the cradle portion; however, the prying portion has sufficient rigidity to withstand the bending or torsional or other loads imparted upon the spatula by the object or objects to be lifted. Moreover, the cradle portion is preferably stiffer than the prying portion so as to provide a secure holder or stable support for the object as it is being manipulated or carried.

In at least one preferred embodiment, the transverse stop means further comprises a concave section in the top surface of the blade. The concave section is preferably adapted to accommodate the size and/or shape of a particular object or objects which are to be retrieved or held.

The transverse stop means preferably substantially arrests at least rearward movement of the object. Furthermore, the transverse stop means may also substantially arrest both forward and rearward movement of the object.

The proximal and distal ends of the cradle portion may be substantially coplanar. Thus, in one embodiment, the transverse stop means may comprise an upwardly concave section disposed generally below the prying portion. The upwardly concave section may have, for example, a generally rounded cross-section, or a generally U-shaped cross-section, or a generally V-shaped cross-section.

In another embodiment, the upwardly concave section may comprise at least two upwardly concave truncated substantially semicylindrical receptacles, wherein the maximum chordlength of each receptacle is smaller than the maximum chordlength of the receptacle disposed at its rear. The nexus of each of the at least two upwardly concave receptacles may further form a cusp.

In yet another embodiment, the transverse stop means may comprise a transverse hump disposed generally above the prying portion. The transverse hump may include a forward concave section, a middle convex section, and a rear concave section. The transverse hump may be either symmetric or asymmetric about the middle convex section.

Alternatively, the proximal and distal ends of the cradle portion may lie in different planes.

In one embodiment, the transverse stop means comprises a substantially flat inclined section. The inclined section may extend rearwardly and upwardly from the prying means. On the other hand, the inclined section may extend forwardly and upwardly from the prying means.

In another embodiment wherein the proximal and distal ends of the cradle portion lie in different planes, the transverse stop means may comprise a concave section. In various embodiments, the concave section may have a generally U-shaped or generally J-shaped or generally C-shaped cross-section.

Thus, the concave section may face generally upwardly. In some embodiments, the upwardly concave section is disposed generally below the prying portion, while in other embodiments, the upwardly concave section is disposed generally above the prying portion.

The concave section may instead, or in addition, face generally forwardly.

In at least one embodiment, at least a part of the cradle portion is disposed forwardly of its distal end, i.e. the proximal end of the cradle portion extends forwardly over itself so as to overlap the distal end of the cradle portion.

The spatula also includes a handle attached to the cradle portion.

The cradle portion may further comprise an aft section disposed at the proximal end of the cradle portion. Thus, in a longitudinal cutaway side view, the cradle portion may possess a generally S-shaped cross-section, or the cradle portion may possess a generally Z-shaped cross-section.

Thus, the concave section and the aft section may form a cusp at the juncture therebetween. Furthermore, the concave section and the prying section may form a cusp at the juncture therebetween.

Preferably, the blade is comprised of heat resistant material.

In an embodiment which is particularly well suited to handle hot dogs or the like, the prying portion preferably has a length in the range of 1 to 3 inches, the transverse width of the prying portion is preferably within the range of one-half the length of a hot dog to one whole hot dog length, and the transverse stop means is disposed between 1.5 and 2.5 inches from the front tip of the spatula.

In one particular embodiment, the present invention provides a spatula for removing a hot dog or the like from a cooking surface, and for handling and transporting the hot dog or the like, the spatula comprising: a handle, having a proximal end, a distal end, a longitudinal axis extending from the proximal end to the distal end, and a grip means disposed between the proximal end and the distal end along the longitudinal axis; and a blade comprising a cradle portion or roll prevention means, having an upper surface, a lower surface, an aft section connected to the distal end of the handle, and a forward section, wherein the roll prevention means substantially prevents the hot dog or the like from rolling or sliding or generally moving backward on the upper surface of the blade and off the spatula. The blade also comprises a prying means having an upper surface and a lower surface, the prying means being connected to the roll prevention means opposite the handle, for prying the hot dog or the like from the support surface or cooking surface, wherein the forward section of the roll prevention means is attached to the prying section.

The forward section of the roll prevention means may comprise a downwardly inclined forward member connecting the aft section to the prying portion, whereby the upper surface of the prying portion is offset to a plane below, and parallel to, the upper surface of the aft section.

In a second particular embodiment, the forward section of the roll prevention means may comprise an upwardly concave substantially semicylindrical receptacle, the receptacle having a longitudinal axis aligned orthogonally to the longitudinal axis of the handle. The forward section may further comprise: a forward downwardly concave edge contiguously connecting the semicylindrical receptacle to the prying portion; and a rearward downwardly concave edge contiguously connecting the semicylindrical receptacle to the aft section of the roll prevention means or cradle portion of the blade.

In a third particular embodiment, the forward section of the roll prevention means comprises at least two upwardly concave substantially semicylindrical receptacles, each receptacle having a longitudinal axis aligned orthogonally to the longitudinal axis of the handle. The at least two upwardly concave substantially semicylindrical receptacles may abut each other, wherein the nexus of each of the receptacles forms a cusp at the upper surface of the forward section of the roll prevention means.

In a fourth particular embodiment, the forward section of the roll prevention means comprises at least two upwardly concave truncated substantially semicylindrical receptacles, wherein the maximum chord length of each receptacle is smaller than the maximum chord length of the receptacle disposed at its rear.

In a fifth particular embodiment, the forward section of the roll prevention means comprises an upwardly inclined forward member connecting the aft section to the prying portion or prying means, whereby the upper surface of the prying means is offset to a plane above, and parallel to, the upper surface of the aft section. A plurality of raised ridges may be disposed on the upper surface of the blade, and in particular on the cradle portion, whereby the raised ridges provide a means to prevent movement, particularly longitudinal movement such as rolling or sliding, of the object on the surface of the blade. The raised ridges may be aligned orthogonally to the longitudinal axis of the handle.

In a sixth particular embodiment, the forward section of the roll prevention means further comprises a plurality of raised ridges disposed on the upper surface of the blade. The raised ridges may be aligned orthogonally to the longitudinal axis of the handle, and the upper surface of the roll prevention means and the prying means may be coplanar.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 3 is a perspective view of a second particular embodiment of a spatula according to the present invention;

FIG. 4 is a side elevational view of the spatula depicted in FIG. 3;

FIG. 5 is a perspective view of a third particular embodiment of a spatula according to the present invention;

FIG. 6 is a side elevational view of the spatula depicted in FIG. 5;

FIG. 7 is a perspective view of a fourth particular embodiment of a spatula according to the present invention shown with optional base members;

FIG. 8 is a cross sectional side view of the spatula depicted in FIG. 7 shown without optional base members;

FIG. 14 shows a spatula according to the present invention having a blade with a transverse stop means comprised of a generally forward facing concave section, whereby the concave section may substantially inhibit rearward movement of an object on the surface of the blade;

FIG. 15 shows a spatula according to the present invention having a blade with a transverse stop means comprised of a generally upwardly and forwardly facing concave section, whereby the concave section may substantially inhibit both forward and rearward movement of an object which nestles in the concave section of the blade;

FIG. 16 shows a spatula according to the present invention having a blade similar to that shown in FIG. 15 and also including an upwardly turned rear end;

FIG. 17 illustrates a spatula according to the present invention having a blade with a transverse stop means comprised of a generally upwardly facing concave section;

DETAILED DESCRIPTION OF THE PREFERRED EMBODIMENTS

Figure 1:
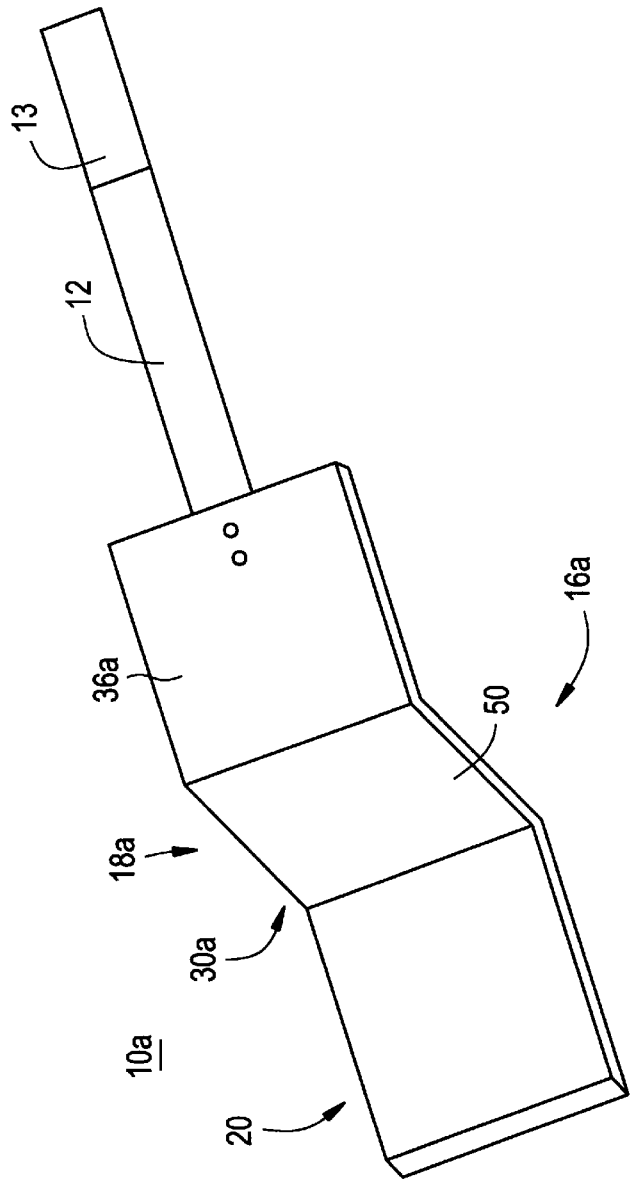
FIG. 1 is a perspective view of a spatula according to one particular embodiment of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

The present invention concerns a spatula for removing an object from a support surface and for substantially preventing the object from falling off during handling. For example, the spatula is particularly well suited to handle generally elongate cylindrical objects, such as foodstuffs like hot dogs, which must be removed from a generally horizontal cooking surface. Thus, the spatula of the present invention prevents such objects from moving generally longitudinally on the top surface of a conventional spatula, either backward or toward one of its sides, thereby preventing the object from undesirably falling off the spatula, whether the object slides or rolls, or both slides and rolls, upon the spatula.

The spatula according to the present invention preferably comprises a blade having a top surface, a bottom surface, a front end and a rear end. The blade further comprises a prying portion and a cradle portion.

The prying portion includes a distal end disposed at the front end of the blade and a proximal end. The cradle portion is disposed rearwardly adjacent the prying portion and includes a distal end attached to the proximal end of the prying portion, a proximal end, and a transverse stop means disposed between the distal and proximal ends of the cradle portion for inhibiting longitudinal movement (front or rear) of the object upon the top surface of the blade.

In at least one embodiment, the blade is asymmetric about a transverse plane extending through the middle of the cradle portion. In at least one other embodiment, the blade is symmetric about a transverse plane extending through the middle of the cradle portion.

Typically, the prying portion is substantially flat or substantially planar. Preferably, the prying portion has a longitudinal length which is sufficiently long in order to pry and lift the desired object onto the top surface of the blade of the spatula. The prying portion is further preferably short enough so that the lifted object is free to careen off the top surface of the blade before at least a portion of the object encounters the cradle portion. In embodiments wherein the spatula is particularly well suited to handle hot dogs or the like, the prying portion preferably has a length in the range of 1 to 3 inches.

Furthermore, the prying portion is preferably flexible, and further preferably more flexible than the cradle portion. The flexibility of the prying portion allows the tip or distal end of the blade to be bent or curved or twisted during insertion under the object to be lifted. Importantly, however, the prying portion has sufficient rigidity to withstand the bending or torsional or other loads imparted upon the spatula by the object or objects to be lifted. Thus, the prying portion may be elastically deformed by the user while providing a base which is strong enough to support the object(s) as it moves toward the cradle portion.

Moreover, the cradle portion is preferably stiffer than the prying portion so as to provide a secure holder or stable support for the object as it is being manipulated or carried.

In at least one preferred embodiment, the transverse stop means further comprises a concave section in the top surface of the blade. The concave section is preferably adapted to accommodate the size and/or shape of a particular object or objects which are to be retrieved or held. The concave section may generally face upwardly, i.e. generally perpendicular to the plane of the prying portion, or the concave section may generally face forwardly, i.e. toward the front or tip of the spatula or toward the prying portion. Furthermore, the concave section may face in a direction which is directed both upwardly and forwardly, e.g. at a 45 degree angle with respect to the prying portion.

The transverse stop means preferably substantially inhibits at least rearward movement of the object. Furthermore, the transverse stop means may also substantially inhibit both forward and rearward movement of the object.

The proximal and distal ends of the cradle portion may be substantially coplanar.

Thus, in one embodiment, the transverse stop means may comprise an upwardly concave section disposed generally below the prying portion. The upwardly concave section may have, for example, a generally rounded cross-section, or a generally U-shaped cross-section, or a generally V-shaped cross-section.

In another embodiment, the upwardly concave section may comprise at least two upwardly concave truncated substantially semicylindrical receptacles, wherein the maximum chordlength of each receptacle is smaller than the maximum chordlength of the receptacle disposed at its rear. The nexus of each of the at least two upwardly concave receptacles may further form a cusp.

In yet another embodiment, the transverse stop means may comprise a transverse hump disposed generally above the prying portion. The transverse hump may include a forward concave section, a middle convex section, and a rear concave section. The transverse hump may be either symmetric or asymmetric about the middle convex section.

Alternatively, the proximal and distal ends of the cradle portion may lie in different planes.

In one embodiment, the transverse stop means comprises a substantially flat inclined section. The inclined section may extend rearwardly and upwardly from the prying means. On the other hand, the inclined section may extend forwardly and upwardly from the prying means.

In another embodiment wherein the proximal and distal ends of the cradle portion lie in different planes, the transverse stop means may comprise a concave section. In various embodiments, the concave section may have a generally U-shaped or generally J-shaped or generally C-shaped cross-section.

Thus, the concave section may face generally upwardly. In some embodiments, the upwardly concave section is disposed generally below the prying portion, while in other embodiments, the upwardly concave section is disposed generally above the prying portion.

The concave section may instead, or in addition, face generally forwardly.

In at least one embodiment, at least a part of the cradle portion is disposed forwardly of its distal end, i.e. the proximal end of the cradle portion extends forwardly over itself so as to overlap the distal end of the cradle portion.

The spatula also includes a handle attached to the cradle portion.

The cradle portion may further comprise an aft section disposed at the proximal end of the cradle portion. Thus, in a longitudinal cutaway side view, the cradle portion may possess a generally S-shaped cross-section, or the cradle portion may possess a generally Z-shaped cross-section.

Thus, the concave section and the aft section may form a cusp at the juncture therebetween. Furthermore, the concave section and the prying section may form a cusp at the juncture therebetween.

Preferably, the prying portion and the cradle portion are integrally formed. For example, the entire blade may be integrally formed. The blade may be formed into its final desired shape in a single step, such as by plastics injection molding, or the blade may be formed in successive steps, such as by providing a metal sheet which is subsequently rolled or stamped or bent or otherwise shaped into a final form.

Preferably, the blade is comprised of heat resistant material.

As mentioned above, the present invention may be adapted particularly well to handle hot dogs or the like, wherein the prying portion preferably has a length in the range of 1 to 3 inches in order to provide adequate flexibility and prying action during use. If the length of the prying portion were longer than the preferred maximum, the hot dog would be presented with an enhanced opportunity to move to either side without sufficiently encountering the cradle portion, and might even tend to fall off the spatula to either side. Furthermore, the transverse width of the prying portion is preferably within the range of one-half the length of a hot dog to one whole hot dog length. If the transverse width were narrower than the preferred minimum, adequate control of the hot dog on its rearward path to the cradle portion would not be easily achieved, as the hot dog would tend to be unstably mounted on the prying portion in the transverse direction, and might even tend to fall off the spatula to either side. Preferably the transverse stop means is disposed between 1.5 and 2.5 inches from the front tip of the spatula.

Figure 2:
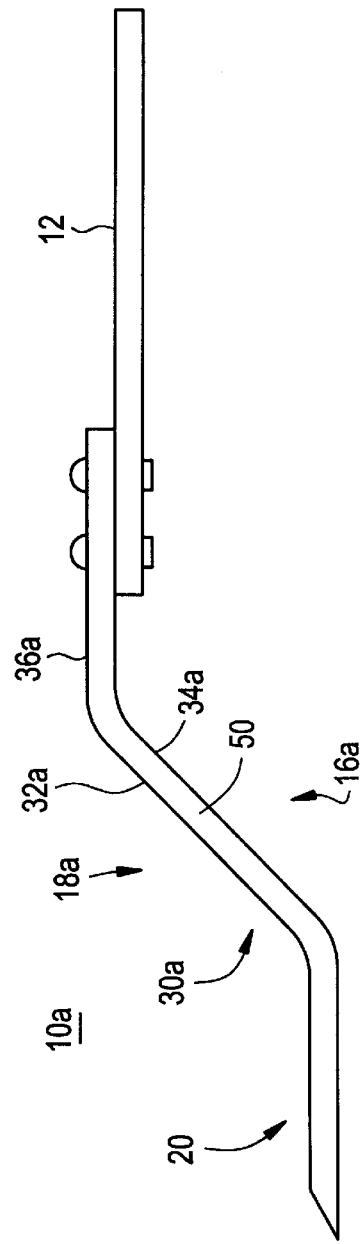
FIG. 2 is a side elevational view of the spatula depicted in FIG. 1.

FIG. 1 illustrates a spatula according to the present invention, generally indicated by the reference numeral 10a. Spatula 10a has a handle 12 and a blade 16a, wherein the blade includes a cradle portion 18a and a prying portion 20. The cradle portion 18a includes a transverse stop means 30a for arresting movement of an object situated thereon. Thus, in at least one aspect, the transverse stop means can serve as a roll prevention means. The butt of the handle 12 is located at the proximal end of the handle, opposite the transverse stop means 30a which is disposed at the distal end of the handle 12. A grip means 13 may be disposed longitudinally between the proximal end and the distal end of the handle 12 about a centerline axis. The stop means 30a has an upper surface 32a, upon which a foodstuff would lie, and a lower surface 34a, as best seen in FIG. 2. The cradle portion also includes an aft section 36a. The handle 12 is shown connected to the aft section 36a, and the prying portion 20 is connected to the forward end of the cradle portion 18a. Likewise, the prying portion 20 has an upper surface 22, upon which a foodstuff would lie after being pried from a surface, and a lower surface 24, as best seen in FIG. 2. These elements also variously appear in FIGS. 3 through 12 with consistent identifying numerals.

In the embodiment shown in FIGS. 1 and 2, the hot dog spatula 10a has a transverse stop means 30a comprised of a downwardly inclined forward member 50 which connects the aft section 36a to the prying portion 20. The upper surface 22 of the prying portion 20 is thus offset to a plane below, and parallel to, the upper surface of the aft section 36a of the transverse stop means 30a. The downwardly inclined forward member 50 prevents a hot dog or the like from rolling or sliding backward when the spatula 10a is tilted up or backward, and the hot dog may nestle at the junction between the prying portion 20 and the downwardly inclined forward member 50. In other words, a substantially flat inclined section 50 extends rearwardly and upwardly from the prying portion 20, thereby providing a transverse stop means 30a. More than one hot dog may thus be gathered at one time and transported.

FIGS. 3 and 4 illustrate a second embodiment of the present invention wherein the transverse stop means 30b comprises an upwardly concave section or upwardly concave substantially semicylindrical receptacle 60b wherein the longitudinal axis of the receptacle 60b is orthogonal to the longitudinal axis of the handle 12, thereby providing a transverse stop means 30b. A hot dog or the like would thus be rolled or slid over the prying portion 20 and come to rest within the transverse receptacle 60b, allowing the handling and transport of the hot dog without its rolling off the spatula 10b. As best seen in FIG. 4, the upwardly concave substantially semicylindrical receptacle 60b has a forward edge 70 which smoothly and contiguously connects the receptacle 60b to the prying portion 20. Likewise, the receptacle 60b preferably has a rearward edge 72 which smoothly and contiguously connects the receptacle 60b to the aft section 36b of the transverse stop means 30b. Edges 70 and 72 may easily be formed when stamping, molding or grinding when stamping, molding or grinding the spatula 10b. Alternately, the edges may be creased or otherwise sharper than that shown in FIGS. 3 and 4.

FIGS. 5 and 6 illustrate a third embodiment of the present invention wherein the transverse stop means 30c comprises two upwardly concave substantially semicylindrical receptacles 60c. The longitudinal axis of each receptacle 60c is shown to be orthogonally aligned to the longitudinal axis of the handle 12. This arrangement allows the transport and handling of more than one hot dog or the like at one time.

FIGS. 7 and 8 show a fourth embodiment according to the present invention wherein the transverse stop means 30d comprises four upwardly concave substantially semicylindrical receptacles 60d, with each receptacle 60d having a longitudinal axis aligned orthogonally to the longitudinal axis of the handle 12. As best seen in FIG. 8, the upwardly concave substantially semicylindrical receptacles 60d are truncated such that the maximum chordlength of each receptacle 60d is smaller than the maximum chordlength of the receptacle disposed at its rear, so that the rearwardmost receptacle 60d is deeper than the next successive receptacle, and so on, resulting in the forwardmost receptacle 60d being the shallowest. This arrangement also allows the transport and handling of more than one hot dog or the like at one time. Additionally, this embodiment facilitates the rolling or sliding of multiple hot dogs into proper positions within the receptacles 60d. When empty, the spatula 10d may be tilted backwards at a higher angle, enabling the first hot dog to bypass the three receptacles 60d located forward of the rearwardmost receptacle 60d and to come to rest in the rearwardmost receptacle 60d. Subsequently the spatula 10d would be tilted backwards at a lesser angle so that the second hot dog would bypass the first two receptacles 60d and finally rest in the third receptacle 60d. This process is repeated for two more hot dogs, wherein the spatula 10d need be tilted backwards by a lesser amount each time, and wherein the previously positioned hot dogs would remain in their respective receptacles 60d on the spatula 10d without rolling off.

As seen in FIG. 7, each end of each receptacle 60d may be optionally capped by a base member 62 in order to further confine the hot dog or the like to the cradle portion 18.

Additionally, as best seen in FIGS. 6 and 8, successive upwardly concave substantially semicylindrical receptacles 60 directly abut each other, such that the nexus of two adjacent receptacles forms a cusp 80. Optionally, two adjacent receptacles 60 could be separated by a flat section of the blade 16.

Figure 9:
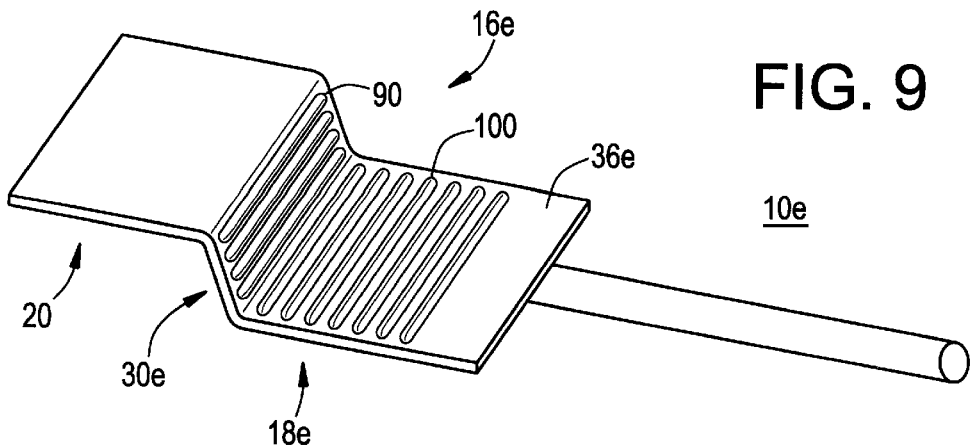
FIG. 9 is a perspective view of a fifth particular embodiment of a spatula according to the present invention.
Figure 10:
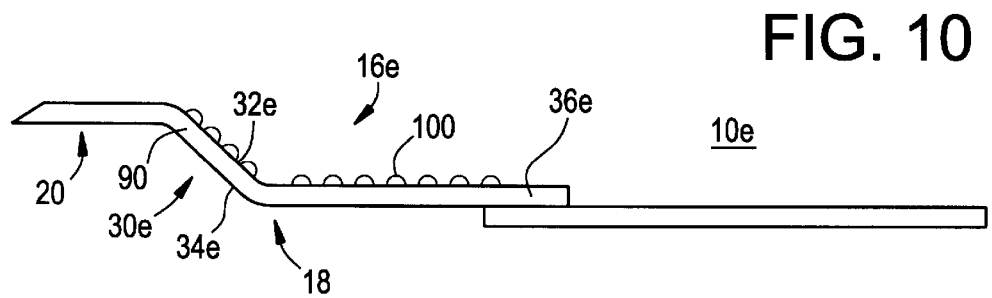
FIG. 10 is a side elevational view of the spatula depicted in FIG. 9.

FIGS. 9 and 10 illustrate a fifth embodiment of the spatula 10e. The transverse stop means 30e has an upwardly inclined forward member 90 which connects the aft section 36e to the prying portion 20. The upper surface 22 of the prying portion 20 is thus offset to a plane above, and parallel to, the upper surface of the aft section 36e. The upwardly inclined forward member 90 prevents a hot dog or the like from rolling or sliding forward when the spatula 10e is tilted forward, and the hot dog may nestle at the junction between the upwardly inclined forward member 90 and the aft section 36e of the blade 16e. A plurality of raised ridges 100 is disposed on the upper surface 32e of the blade 16e, the ridges 100 being aligned orthogonally to the longitudinal axis of the handle 12. The raised ridges 100 inhibit the rolling or sliding of hot dogs or the like on the blade 16e. The raised ridges 100 can accommodate foodstuffs of various sizes and diameters and prevent rolling off the spatula 10e.

Figure 11:
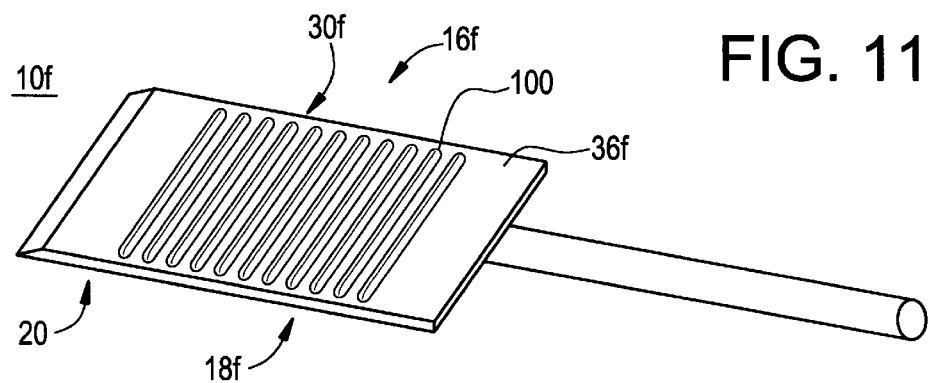
FIG. 11 is a perspective view of a sixth particular embodiment of a spatula according to the present invention.
Figure 12:
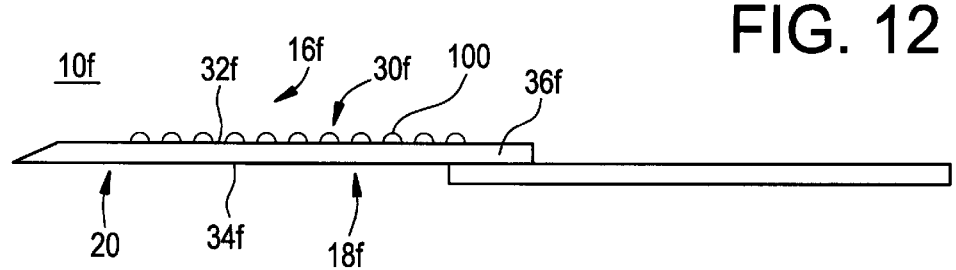
FIG. 12 is a side elevational view of the spatula depicted in FIG. 11.

FIGS. 11 and 12 illustrate a sixth embodiment of the hot dog spatula 10f wherein the prying portion 20 and the transverse stop means 30f are coplanar. The transverse stop means 30f is comprised of a plurality of raised ridges 100.

Figure 13:
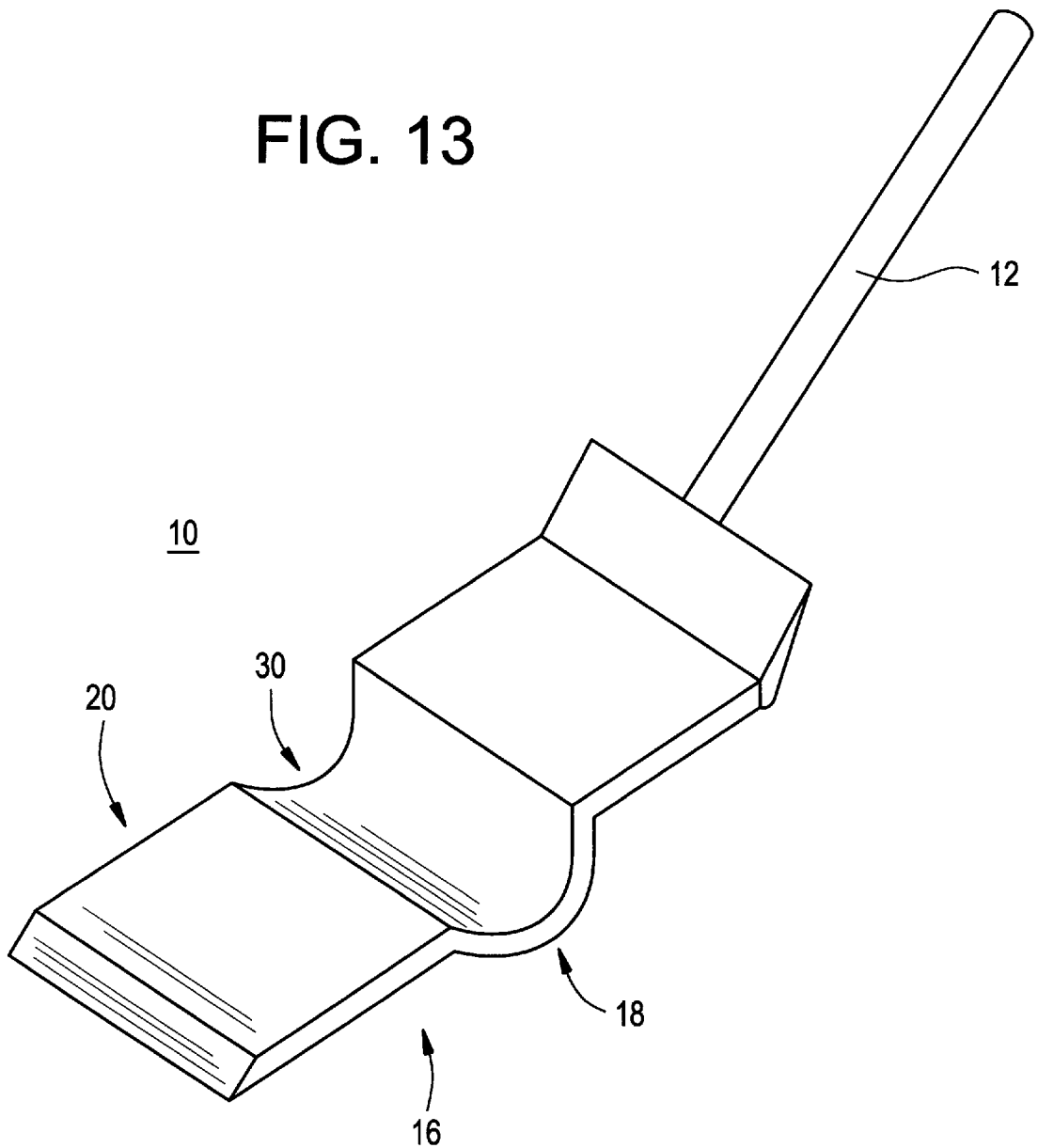
FIG. 13 illustrates another embodiment of a spatula according to the present invention having an upwardly turned rear end to which the handle is attached.

FIG. 13 illustrates another embodiment of a spatula according to the present invention having an upwardly turned rear end to which the handle is attached. The upwardly turned rear end allows the handle to be angularly offset from the plane of the blade.

FIGS. 14–17 illustrate side views of various embodiments according to the present invention.

Figure 14:
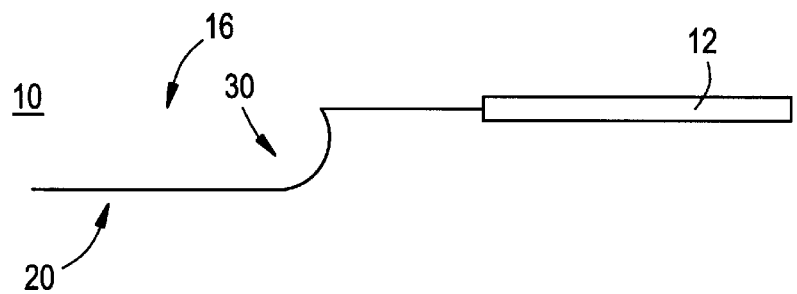
FIGS. 14–17 illustrate side views of various embodiments according to the present invention.

FIG. 14 shows a spatula having a blade with a transverse stop means comprised of a generally forward facing concave section, whereby the concave section may substantially inhibit rearward movement of an object on the surface of the blade. The concave section is shown forming a cusp with the aft section of the blade. The concave section is generally disposed above the plane of the prying portion.

Figure 15:
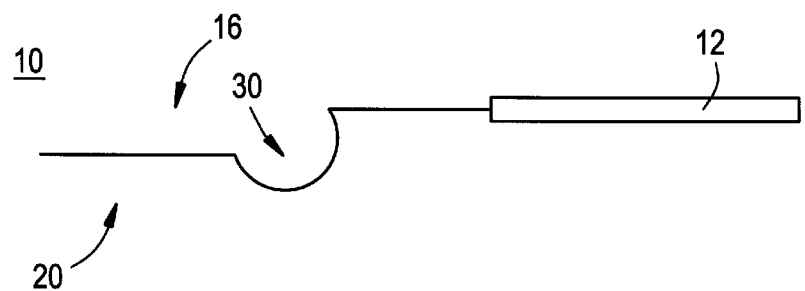

FIG. 15 shows a spatula having a blade with a transverse stop means comprised of a generally upwardly and forwardly facing concave section, whereby the concave section may substantially inhibit both forward and rearward movement of an object which nestles in the concave section of the blade. The concave section is shown forming a cusp with the aft section of the blade. A part of the concave section is disposed below the plane of the prying portion.

Figure 16:
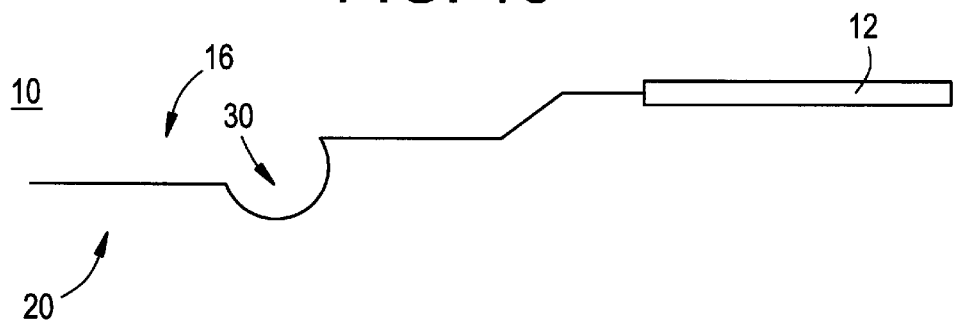

FIG. 16 shows a spatula having a blade similar to that shown in FIG. 15 and also including an upwardly turned rear end. A part of the concave section is disposed below the plane of the prying portion.

Figure 17:
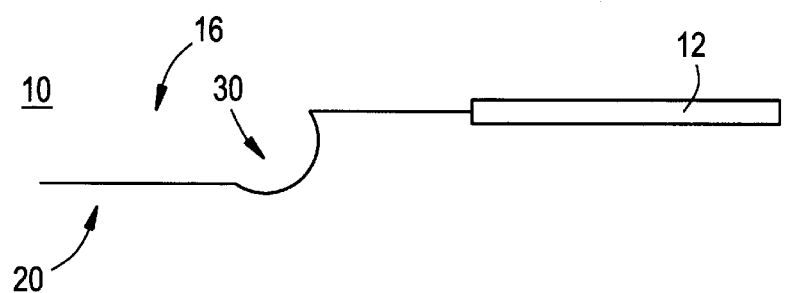

FIG. 17 illustrates a spatula having a blade with a transverse stop means comprised of a generally upwardly facing concave section. A part of the concave section is disposed below the plane of the prying portion.

Figure 18:
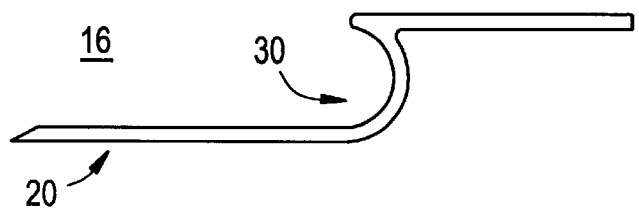
FIG. 18, shows a blade according to the present invention similar to that shown in FIG. 14 comprising a rounded cusp.

FIG. 18 shows a blade similar to that shown in FIG. 14 comprising a rounded cusp. The concave section is generally disposed above the plane of the prying portion.

Figure 19:
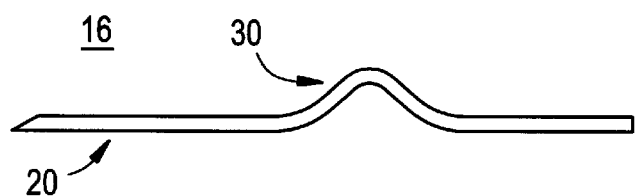
FIG. 19 shows a blade according to the present invention having a transverse hump.

FIG. 19 shows a blade having a transverse hump. The hump is shown generally disposed above the plane of the prying portion. The transverse hump is generally symmetric about a transverse vertical plane passing through the hump.

Figure 20:
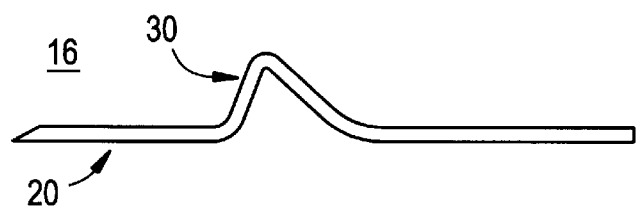
FIG. 20 illustrates a blade according to the present invention having a transverse hump wherein the transverse hump is generally asymmetric about a transverse vertical plane passing through the hump and is biased in a forward direction.

FIG. 20 illustrates a blade having a transverse hump. The hump is shown generally disposed above the plane of the prying portion. The transverse hump is generally asymmetric about a transverse vertical plane passing through the hump and is biased in a forward direction.

Figure 21:
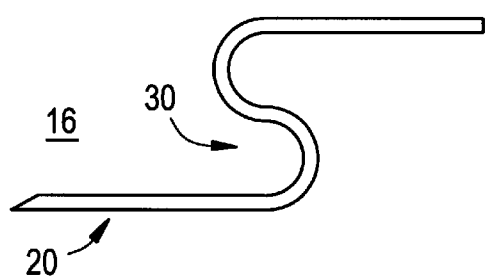
FIG. 21 illustrates a blade according to the present invention having an S-shaped cradle portion.
Figure 22:
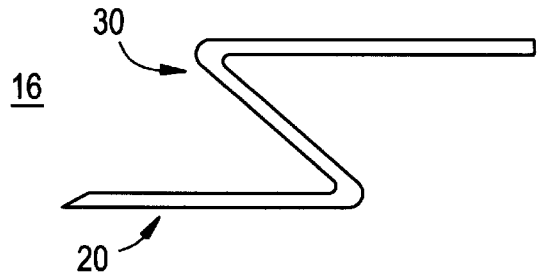
FIG. 22 illustrates a blade according to the present invention having a Z-shaped cradle portion.

FIG. 21 illustrates a blade having an S-shaped cradle portion, while FIG. 22 illustrates a blade having a Z-shaped cradle portion.

Figure 23:
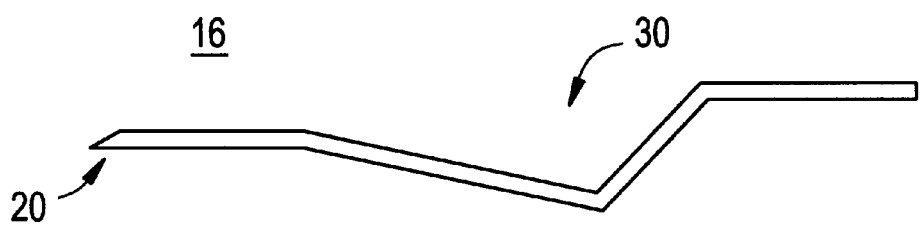
Figure 23 illustrates a blade according to the present invention having a transverse stop means with a generally upwardly concave section formed from a forward flat section and rearward flat section.

FIG. 23 illustrates a blade having a transverse stop means with a generally upwardly concave section formed from a forward flat section and rearward flat section. The transverse stop means is shown to be asymmetric and at least partially disposed below the plane of the prying portion, wherein the forward flat section is longer than the rearward flat section, and the forward flat section forms a smaller acute angle with the prying portion than the rearward flat section makes with the aft section.

Figure 24:
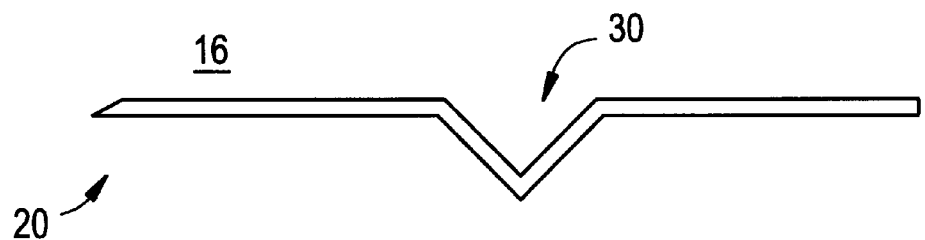
FIG. 24 illustrates a blade according to the present invention having a transverse stop means with a generally upwardly concave section formed from a forward flat section and rearward flat section.

FIG. 24 illustrates a blade having a transverse stop means with a generally upwardly concave section formed from a forward flat section and rearward flat section. The transverse stop means is shown to be symmetric and at least partially disposed below the plane of the prying portion.

Figure 25:
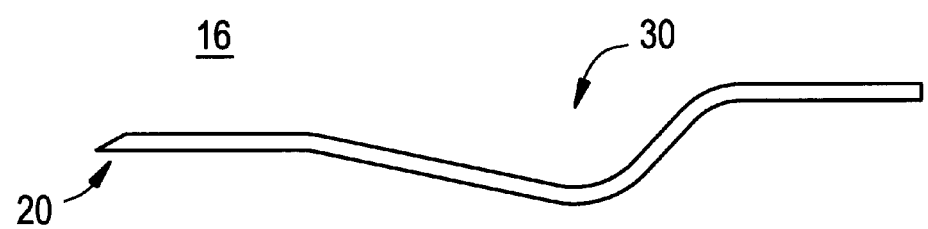
FIG. 25 illustrates a blade according to the present invention having a transverse stop means comprised of an asymmetric generally upwardly concave section which is at least partially disposed below the plane of the prying portion.

FIG. 25 illustrates a blade having a transverse stop means comprised of an asymmetric generally upwardly concave section which is at least partially disposed below the plane of the prying portion. The proximal and distal ends of the cradle portion generally lie on the same plane, i.e. they are coplanar.

Figure 26:
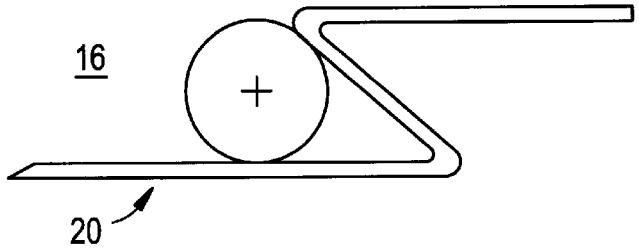
FIG. 26 illustrates the embodiment of the blade according to the present invention of FIG. 22, shown adapted to accommodate an object, such as a hot dog, within its cradle portion.

FIG. 26 illustrates the embodiment of the blade of FIG. 22, shown adapted to accommodate an object, such as a hot dog, within its cradle portion. The proximal end of the concave section is disposed forwardly of its distal end. The distal end is spaced apart from the proximal end, as well as the prying portion, to enable the hot dog to securely nestle therebetween.

Figure 27:
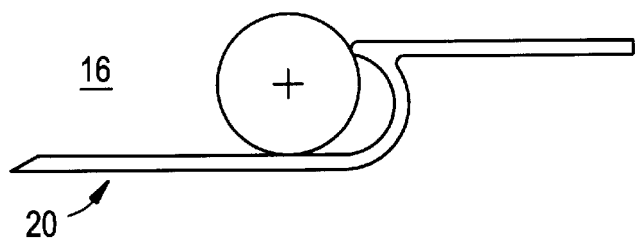
FIG. 27 illustrates an embodiment of the blade according to the present invention similar to that shown in FIG. 26, shown adapted to accommodate an object, such as a hot dog, within its cradle portion wherein the distal end of the cradle portion is offset from the prying portion sufficiently to contact the hot dog or the like above the center of gravity of the hot dog, thereby providing a secure or stable resting position for the hot dog.

FIG. 27 illustrates an embodiment of the blade similar to that shown in FIG. 26, shown adapted to accommodate an object, such as a hot dog, within its cradle portion. The proximal end of the concave section is disposed forwardly of its distal end. The distal end is spaced apart from the proximal end, as well as the prying portion. However, the periphery of the hot dog or the like is adapted to encounter the distal end of the cradle portion without a significant portion of the object reaching the space between the distal and proximal ends of the transverse stop means. However, the distal end of the cradle portion is offset from the prying portion sufficiently to contact the hot dog or the like above the center of gravity of the hot dog, thereby providing a secure or stable resting position for the hot dog.

Figure 28:
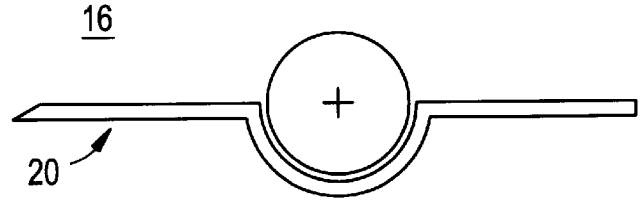
FIG. 28 illustrates an embodiment of the blade according to the present invention wherein the transverse stop means is comprised of an upwardly concave section or receptacle having a generally U-shaped cross-section.

FIG. 28 illustrates an embodiment of the blade wherein the transverse stop means is comprised of an upwardly concave section or receptacle having a generally U-shaped cross-section. The blade is adapted to allow at least a portion of the hot dog or the like to rest below the top surface of the prying means so as to cradle or nestle the hot dog and thereby substantially prevent forward or rearward movement thereof.

Figure 29:
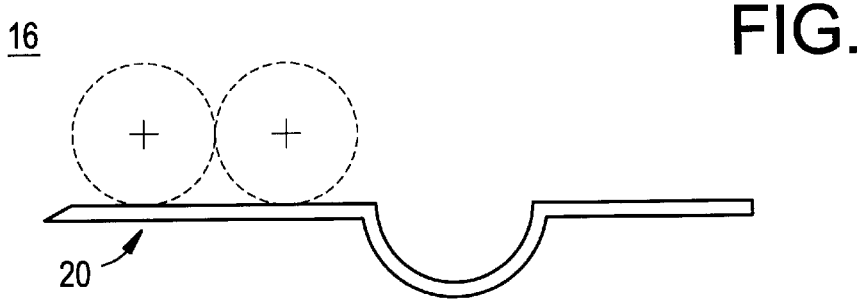
FIG. 29 illustrates an embodiment of the present invention wherein the transverse stop means is comprised of an upwardly curved section forming a channel disposed generally below said prying portion between said distal and proximal ends of said cradle portion and extending through said opposing sides for arresting movement of the object upon said top surface of said blade.

FIG. 29 illustrates an embodiment of the present invention wherein the transverse stop means is comprised of an upwardly curved section forming a channel disposed generally below said prying portion between said distal and proximal ends of said cradle portion and extending through said opposing sides for arresting movement of the object upon said top surface of said blade.

Figure 30:
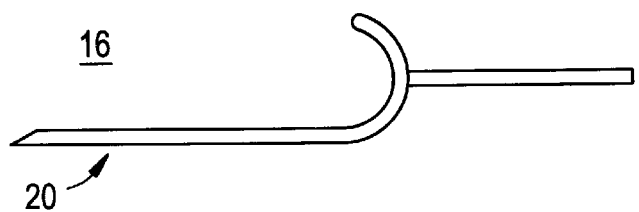
FIG. 30 illustrates an embodiment of the present invention wherein the transverse stop means is comprised of an forwardly curved section forming a channel disposed generally facing forward toward said prying portion between said distal and proximal ends of said cradle portion and extending through said opposing sides of said cradle for arresting movement of the object upon said top surface of said blade.

FIG. 30 illustrates an embodiment of the present invention wherein the transverse stop means is comprised of an forwardly curved section forming a channel disposed generally facing forward toward said prying portion between said distal and proximal ends of said cradle portion and extending through said opposing sides of said cradle for arresting movement of the object upon said top surface of said blade.

In general, various embodiments of the spatula according to the present invention having a proximal end of the concave section offset from the distal end thereof, i.e. the ends lie in different planes, further enables the hand of the user to be spaced apart from the surface from which the object is to be retrieved.

The spatula 10 may be formed conveniently and economically from among a variety of suitable materials, including but not limited to plastic, wood, and metal. The various parts of the invention may be injection molded, stamped, ground or cut from those materials. The forward edge of the prying portion 20 is preferably thin, and may contain a bevel or sharpened edge. The prying member 20 may be substantially flat and have a substantially rectangular profile when viewed from above. The prying member may also have a rounded, multifaceted, or oblong profile.

The handle 12 may be affixed to the aft portion 36 of the roll prevention means 30 in a variety of ways. The handle 12 may be affixed to the lower surface of the transverse stop means 30, or abut same end to end, or a combination of the two, as illustrated in FIGS. 2, 4 and 6, respectively. The handle 12 may be connected by glue, fasteners, or spot welding, or the handle 12 may be integrally formed or molded with the transverse stop means 30.

Similarly, the raised ridges 100 may be affixed by glue or welding, or may be integrally formed or molded with the upper surface of the transverse stop means 30.

The spatula 10 may be composed, in whole or in part, of heat resistant material to allow prolonged contact with a heated surface without damaging or deforming the spatula. Thus, the spatula 10 could be rested upon or continuously used on hot surfaces for long periods of time.

It should be noted that the spatula 10 should preferably be constructed so as to allow for some variation in size and/or shape which may occur in an object such as a hotdog, for example between cooked and uncooked or frozen and unfrozen states.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A spatula for removing an object from a support surface and for substantially preventing the object from falling off during handling, said spatula comprising:
    a blade having a top surface, a bottom surface, a front end and a rear end, said blade further comprising:
        a prying portion including a distal end disposed at said front end of said blade and a proximal end; and
        a cradle portion disposed rearwardly adjacent said prying portion and including a distal end attached to said proximal end of said prying portion, a proximal end, and a transverse stop means disposed between said distal and proximal ends of said cradle portion for arresting movement of the object upon said top surface of said blade;
        wherein said proximal and distal ends of said cradle portion are substantially coplanar;
        wherein said transverse stop means further comprises an upwardly concave section having a generally uniform widthwise cross-section disposed generally below said prying portion.

2. The spatula according to claim 1 wherein said transverse stop means substantially inhibits both forward and rearward movement of the object.

3. The spatula according to claim 1 wherein said transverse stop means substantially inhibits rearward movement of the object.

4. The spatula according to claim 1 wherein said upwardly concave section has a generally U-shaped cross-section.

5. The spatula according to claim 1 wherein said upwardly concave section further comprises at least two upwardly concave truncated substantially semicylindrical receptacles, wherein the maximum chordlength of each receptacle is smaller than the maximum chordlength of the receptacle disposed at its rear.

6. The spatula according to claim 5 wherein the nexus of each of said at least two upwardly concave receptacles forms a cusp.

7. The spatula according to claim 1 further comprising a handle attached to said cradle portion.

8. The spatula according to claim 1 wherein said cradle portion further comprises an aft section disposed at its proximal end.

9. The spatula according to claim 8 wherein said concave section and said aft section form a cusp at the juncture therebetween.

10. The spatula according to claim 1 wherein said concave section and said prying portion form a cusp at the juncture therebetween.

11. A spatula for removing a generally elongated, cylindrical object from a support surface and for substantially preventing the object from falling off during handling, said spatula comprising:
    a blade having a top surface, a bottom surface, opposing sides, a front end and a rear end, said blade further comprising:
        a prying portion including a distal end disposed at said front end of said blade and a proximal end; and
        a cradle portion disposed rearwardly adjacent said prying portion and including a distal end attached to said proximal end of said prying portion, a proximal end, and an upwardly curved section forming a channel disposed generally below said prying portion between said distal and proximal ends of said cradle portion and extending through said opposing sides for arresting movement of the object upon said top surface of said blade;
        wherein said proximal and distal ends of said cradle portion are substantially coplanar.

12. The spatula according to claim 11 further comprising a handle attached to said cradle portion.

13. The spatula according to claim 12 wherein said cradle portion further comprises an aft section disposed at its proximal end.

14. The spatula according to claim 11 wherein said curved section is generally U-shaped to receive said generally cylindrical object to stop movement of said object across said spatula.

15. A spatula for removing a generally elongated, cylindrical object from a support surface and for substantially preventing the object from falling off during handling, said spatula comprising:
    a blade having a top surface, a bottom surface, opposing sides, a front end and a rear end, said blade further comprising:
        a prying portion including a distal end disposed at said front end of said blade and a proximal end; and
        a cradle portion disposed rearwardly adjacent said prying portion and including a distal end attached to said proximal end of said prying portion, a proximal end, and a U-shaped section of generally uniform cross-section disposed generally below said prying portion between said distal and proximal ends of said cradle portion and extending through said opposing sides for arresting movement of the object upon said top surface of said blade;

wherein said proximal and distal ends of said cradle portion are substantially coplanar and said U-shaped section is adapted to receive said object in order to stop movement of said object across said cradle portion.

16. The spatula according to claim 15 wherein said proximal and distal coplanar ends of said cradle are maintained in spaced apart relation.

* * * * *